March 5, 1957  G. G. LANDIS ET AL  2,784,301
METHOD OF ARC WELDING
Filed April 26, 1954
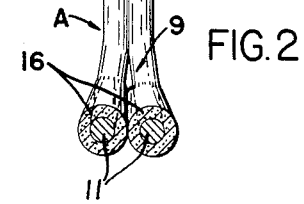
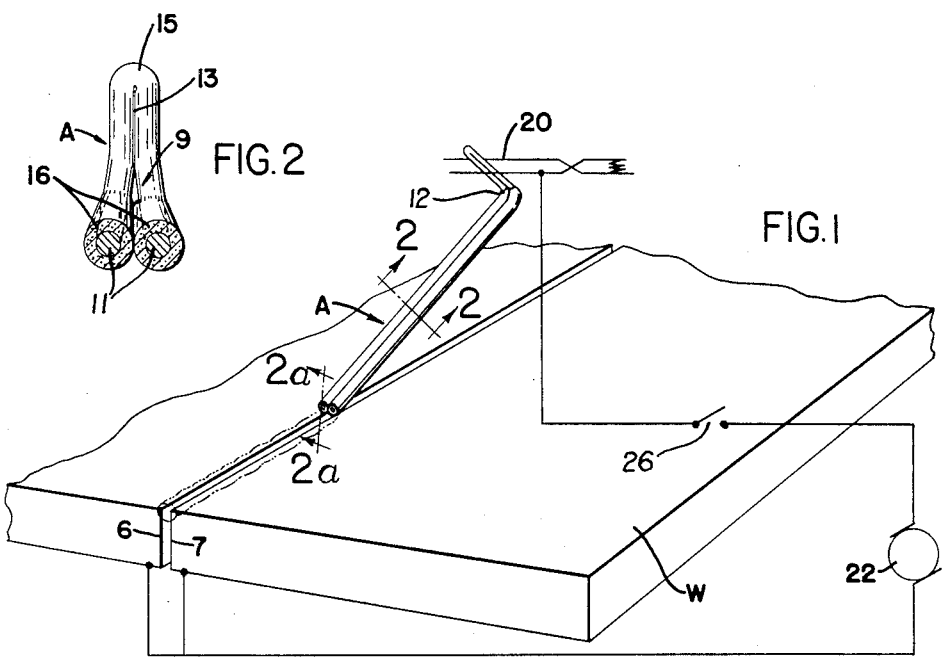
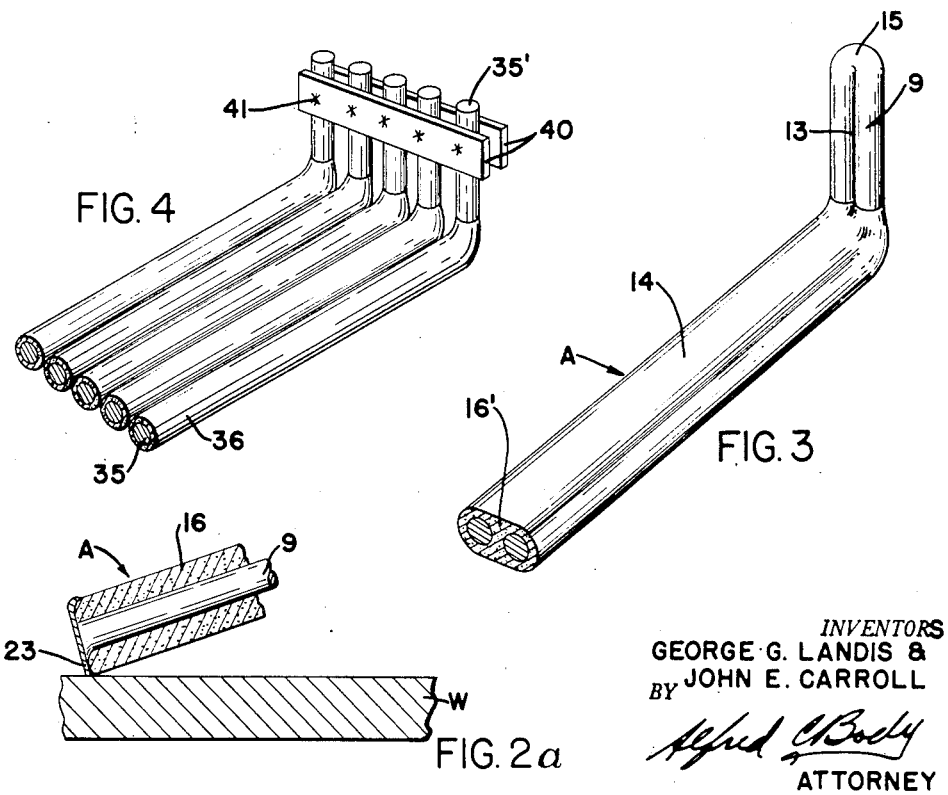
*INVENTORS*
GEORGE G. LANDIS &
BY JOHN E. CARROLL
ATTORNEY

United States Patent Office 2,784,301
Patented Mar. 5, 1957

2,784,301

METHOD OF ARC WELDING

George G. Landis and John E. Carroll, South Euclid, Ohio, assignors to The Lincoln Electric Company, Cleveland, Ohio, a corporation of Ohio Application April 26, 1954, Serial No. 425,377

2 Claims. (Cl. 219—137)

This invention pertains to the art of electric arc welding and, more particularly, to an arc-welding electrode and method of electric arc welding.

In the art of arc welding, it is conventional to hold an electrode at an angle relative to the weld seam of between approximately 75 to 90 degrees. The electrode end electrically energized relative to the workpiece is then lightly touched to the workpiece and withdrawn to strike the arc. If the initial contact is too heavy or if the electrode is not properly drawn back away from the workpiece, either a spot welding of the electrode end to the workpiece results or the arc will go out. Furthermore, the operator has extreme difficulty in touching the electrode to the workpiece at the exact point where he desires to commence the welding operation. Prior to the striking of the arc, he must shield his eyes with a lens which is, to all intents and purposes, completely opaque prior to the striking of the arc. Thus, the electrode must be touched to the workpiece with the operator completely blind.

If the electrode end is first touched to the workpiece and then electrically energized, it is possible to accurately locate the electrode end without the impediment of the opaque lens. However, the tendency in such a case is for the electrode end to spot weld to the workpiece rather than to properly strike the arc. In the alternative, the arc goes out when the welding operator attempts to pull the electrode away from the workpiece after it partially spot welds thereto.

In any event, the proper initiation of the electric arc requires a skilled welding operator.

After the arc is struck, the welding operator advances the electrode toward the workpiece as the electrode end burns off. Also, the electrode is advanced along the weld seam to deposit a continuous weld bead. In addition to these two movements, the welding operator must slightly oscillate the end of the welding electrode relative to the length of the bead so as to properly control the width of the welding bead laid down and melt down both edges being welded. Coordinating these three movements also requires a highly skilled welding operator.

A particular skill in the oscillating movement is required whenever there is a gap or where a corner or fillet is to be welded. The electric arc serves the dual purpose of both melting the workpiece along the seam and melting off the electrode end so that the molten metals intermix and form a homogeneous weld bead. It has been determined that there is at one time only one arc which exists between the electrode end and the workpiece and this arc normally goes across the shortest path from the electrode end to the workpiece. Unless the electrode end is oscillated and with spaced edges, the arc only goes to one edge. With a fillet weld, the electrode cannot be pushed all the way down into the corner and the arc goes to only one of the surfaces at a point spaced from the corner. In the alternative, the arc may weld along one edge or surface for a short distance and then jump across to the other edge or surface.

In either event, as there is no common pool of molten metal simultaneously on both edges or surface with which the melted off electrode can intermix, a good weld bead does not result. This problem is overcome by oscillating the electrode end but, as pointed out, this requires operator skill.

The problem becomes particularly apparent when the electrode is laid parallel or almost parallel to and in the plane of the desired weld seam and the welding operation is allowed to proceed substantially automatically by allowing the electrode end to burn back and deposit the weld bead without any manipulation of the welding electrode. Prior to the present invention, to the best of our knowledge, it has been impossible to properly effect the weld bead with the electrode so positioned when the edges to be welded are in even slightly spaced relationship or when a corner or fillet is to be welded.

The present invention contemplates an arc-welding electrode and a method of welding with same which overcomes all of the above referred to difficulties and enables the depositing of good weld beads by the most inexperienced of welding operators.

In accordance with the present invention, an arc-welding electrode is provided comprised of a plurality of cores of the desired weld metal to be deposited coated with an electrically insulating weld-rod coating and in close-spaced parallel relationship, the cores being electrically interconnected only at the end remote from the welding end. Such end is normally bare and at a slight angle to the coated portion whereby the bared end may be held in an electrode holder while the coated portion is held close to the workpiece over its length. Generally, there will be two of such wires, although the invention does not exclude the use of more than two wires.

Further, in accordance with the invention, a method of arc welding is provided comprising providing an electrode comprised of a plurality of cores of the weld metal to be deposited and in close-spaced parallel relationship with an electrically insulating weld-rod coating around each core, positioning such electrode in the plane of the weld bead and at an angle relative to the bead of less than 30 degrees with one end touching the workpiece, electrically interconnecting and energizing the cores at the other end to start the electric arc and holding the electrode from movement either longitudinally of or transversely to the weld bead as the weld progresses.

The principal object of the invention is the provision of a new and improved arc-welding electrode which does not require any skill in order to lay down high-quality weld beads.

A further object of the invention is the provision of a new and improved arc-welding electrode which will effect a weld bead without any movement of the electrode relative to the workpiece during the welding operation.

Still another object of the invention is the provision of a new and improved arc-welding electrode which enables the effecting of a weld without the need for the welding operator to even observe the welding operation from beginning to end.

Still another object is the provision of a new and improved method of hand welding which enables good welds to be obtained even in difficult situations without any manipulation of the electrode by the welding operator.

The invention may be embodied in certain parts and arrangements of parts, a preferred embodiment of which will be described in detail in this specification and illustrated in the accompanying drawing which forms a part hereof, and wherein:

Figure 1 shows an arc-welding electrode constructed in accordance with the present invention in welding position relative to a workpiece;

Figure 2 is a cross-sectional view of Figure 1 taken approximately on the line 2—2 thereof;

Figure 2a is a fragmentary cross-sectional view of Figure 1 taken approximately on line 2a—2a of Figure 1;

Figure 3 is a perspective view of an alternative form which the invention may take; and Figure 4 is a view similar to Figure 3 but showing a total of five electrodes so arranged as to deposit a relatively wide bead such as might be used in surfacing a metallic workpiece.

Referring now to the drawings wherein the showings are for the purposes of illustrating physical constructions which the invention may take and not for the purposes of limiting the invention, Figures 1 and 2 show a workpiece W having a pair of edges 6 and 7 in slightly spaced relationship and an electrode A in welding relationship relative to these edges 6 and 7.

The electrode A is comprised generally of a wire 9 of welding material bent double on itself at its mid point 15 to form a pair of spaced parallel legs 11, in turn bent through an angle of approximately 80 degrees at a point 12 adjacent to but spaced from the mid point 15 to form a stub portion 13 and a welding portion 14.

The stub portion 13 as shown is bare whereby electrical contact may be made with both legs of the electrodes.

The welding portion 14 of each leg has a coating 16 of refractory-like material extending generally from the left-hand end of the electrode as viewed in Figure 1 to at least and preferably slightly around the bend 12.

The metal from which the wire 9 is made may be of any type which it is desired to have deposited in the weld bead; such as, but not limited to, ordinary low-carbon steels, high-alloy steels, copper, aluminum, nickel or the like. The particular type of metal employed forms no part of the present invention and will not be described further herein.

In use, the electrode A is intended to be positioned generally symmetrical to the edges 6 and 7 and parallel to the plane thereof with the welding portion 14 being either parallel to the edges 6, 7 or at a slight angle relative thereto. Such angle preferably is not in excess of 30 degrees and, preferably, will be less than 30 degrees.

During such welding operation, the coating 16 always spaces the wire 9 from the surfaces of the workpiece W. The coating 16 may be of any known or desired refractory material normally employed in electric arc welding and as the materials employed in such coating form no part of the present invention, they will not be described further herein. However, in accordance with the invention, the coating 16 must be electrically nonconductive. By electrically nonconductive is meant a coating which if rubbed, pressed or laid on a workpiece energized relative to the wire 9 at normal open-circuit voltages employed in arc welding, an arc will not be struck through the coating itself.

Obviously, there are coatings employed in arc welding which are not electrically nonconductive in the terms of the above definition, such coatings being employed where certain other characteristics from the coating are required. In the event such a coating is employed, then, in accordance with the invention, an outer layer of electrically insulating material will be superimposed on the base coating.

The electrode shown in Figures 1 and 2 is manufactured by first taking the wire 9 in a straight or unformed state. The coating material is then extruded around this wire as is convention and known in the art. Subsequently, the center portions of the coated wire 9 are scraped or otherwise cleaned of the coating material. The wire 9 is then bent double at its mid point and the angle formed between the stub portion and the welding portions by a suitable bending operation. Either prior to or subsequent to this bending and forming operation, the coating 16 may be dried as is conventional and known in the art. It will be noted that the coating around the wire 9 serves to insulate and physically space both legs of the wire 9.

Obviously, the electrode A may be formed from two separate and distinct welding electrodes by laying the coated portions in side-by-side relationship and physically and electrically interconnecting the stub portion thereof. This may be accomplished by an electrically conductive jumper welded or soldered to the ends, or the jaws of the electrode holder may perform this function.

It should also be pointed out that it is not necessary on every occasion to have the stub portion 13 disposed at an angle to the welding portion 14. With the construction shown, however, it is possible to grasp the stub portion 13 in a conventional electrode holder shown schematically at 20 and lay the entire welding portion 14 onto the surface of the workpiece. If the stub portion 13 formed a straight extension of the welding portion 14, it will be appreciated that because of the thicknesses of the jaws of the electrode holder 20, it would be impossible to lay the welding portion 14 parallel to the edges 6 and 7 for its entire length.

It will be appreciated that with the coating 16 being electrically non-conductive and, thus, physically spacing the wire 9 from the workpiece W when the electrode is in the welding position shown in Figure 1, there will be some difficulty in initially establishing the contacts from the wire 9 to the workpiece W so as to strike the arc. Any known form of arc starter may be employed, or it is possible to first raise the electrode A to such an angle that contact can be made between the wire 9 and the workpiece W and then bring the electrode down to the angle above described.

In the preferred embodiment of the invention, however, it is preferred that the electrode A be provided with what may be termed a match tip to assist in the starting of the arc with the electrode always being held in the position shown in Figure 1 so that no manipulation of the electrode is required by the welding operator to either start the welding arc or to continue the welding operation. Thus, in the preferred embodiment of the invention, the left-hand end of the wire 9 is provided with a lateral extension 23 of a cross-sectional area substantially less than the cross-sectional area of the wire 9. This extension 23 extends at least to and, preferably, slightly beyond the sides of the coating 16. The entire tip of the electrode is then coated with a mixture of potassium nitrate, silicon dioxide and a binder and then dried. It will be noted that the direction of the extension 23 is generally in a direction perpendicular to the plane through the two legs of the welding portion 14 whereby, when the electrode is positioned relative to the edges 6, 7 as viewed in Figure 2, the end of the tip 23 can contact the workpiece W.

The operation and specific details of construction of this match tip are more clearly described in our copending application Serial No. 425,378 filed April 26, 1954, now abandoned, and reference is made thereto for a more complete description.

In order to effect a weld in accordance with the present invention, the workpiece W with its edges 6, 7 to be welded in either close abutting relationship or in spaced relationship are connected to one terminal of a welding-current power source 22. This power source may be of any known type such as a motor generator, either D. C. or A. C., or a transformer or the like. The other terminal of this power source is connected through a switch shown schematically at 26 to the electrode holder 20 which, as shown, is gripping the stub portion 13 of the electrode A. The electrode is then positioned symmetrically relative to the plane of the edges 6, 7 with the welding portion 14 either in engagement over its entire length with the edges 6, 7 or at a slight angle thereto less than 30 degrees. The tip of the extension 23 is thus touching the surfaces of the workpiece W. It will be appreciated that this positioning of the electrode can be done without first covering the eyes with an opaque lens of the type normally found and employed in arc welding. At this point, the operator can either close his eyes or position an opaque lens before his eyes if he desires to watch the welding operation progress. The electrode is then energized by closing the switch 26. The arc immediately starts due to the contact of the extension 23 with the surface of the workpiece. Thereafter, the arc burns back the electrode A to deposit a weld bead which is covered with and protected from the air by the coating 16 which melts in the heat of the arc and then congeals on top of the weld metal.

Where fillet or lap welds are to be made, the length or axis of the electrode will preferably be held symmetrical relative to the two surfaces forming the corner to be welded. The two wires should be contained in a plane forming an angle of 45 degrees with these surfaces. The length of the electrode should have an angle of between 15 and 30 degrees relative to the desired weld bead. The welding operation is the same. As the electrode burns off, the end is continuously pressed toward the corner while holding the electrode against longitudinal or transverse movement relative to such corner.

The welding currents useable with the present invention vary as the square root of the number of electrode core wires over that employed for a single core wire of the same diameter. Thus, two core wires require 1.4 times the desirable current for one wire while three wires require 1.7 times.

The following table indicates the general current ranges to be employed using single and parallel core wires, the latter in accordance with the present invention:

| Core Wire Diameter, Inches | Welding Current, Amperes, One Wire | Welding Current, Amperes, Two Wires |
| --- | --- | --- |
| 1/16 | 36 | 50 |
| 5/64 | 60 | 85 |
| 3/32 | 90 | 128 |
| 1/8 | 130 | 184 |
| 5/32 | 150 | 215 |

The arc voltage in all cases is 21 volts and the figures are for 60-cycle alternating current.

During the entire welding operation, the coating 16 always spaces the wire 9 from the workpiece W. As the spacing of the arcing end of the electrode wire determines to a large extent the actual voltage across the arc, it will be appreciated that by varying the thickness of the coating and, thus, the spacing of the wire from the workpiece, the arc voltage may also be varied. Normally, this thickness of the coating will be adjusted in the course of manufacture of the electrode. It has been found that when the coating has a thickness approximately equal to one-third the diameter of the wire 9, the arc voltage will be satisfactory for most welding purposes. In addition, such a thickness provides the proper amount of coating which, when melted down in the heat of the arc, satisfactorily covers the weld bead.

Because of the uniform spacing of the wire 9 from the workpiece during the entire welding operation and the lack of any variables caused by manipulation of the electrode by the welding operator, extremely satisfactory and uniform welds may be obtained.

It might be pointed out that the welding operation which results is far different from that if a single electrode wire were laid along the spaced edges to be welded. With one electrode wire, the weld progresses along one edge for the entire length of the electrode or, in the alternative, progresses for a short distance of say one-half inch along one edge and then shifts to the other edge where it progresses for another one-half inch. Such a weld bead is completely unacceptable. On the other hand, using the present invention, an arc results which very rapidly oscillates back and forth from one edge and core end to the other and at a rate such that before the molten weld metal of one edge has had a chance to congeal, the arc is returned. Thus, both edges are melted down as though there were two arcs.

It will be noted that no manipulation of any kind of the electrode by the operator during this welding operation is required.

This oscillation of the arc gives, in effect, the equivalent result of a welder oscillating the electrode end back and forth across the work. The difference is that the latter requires a high degree of skill, the former none.

Stated otherwise the oscillation of the arc distributes the arc energy over a wider surface of the workpiece resulting in a wider bead. Penetration for a given amount of metal deposited per unit length of weld bead is decreased. Thinner gages of metal can thus be welded using the invention than heretofore thought possible.

It has long been known that two close-spaced electrodes connected in electrical parallel relationship and at the current densities in the electrode wire used in hand welding will produce an unstable arc which will oscillate back and forth from one electrode to the other. The present invention makes use of this phenomenon to weld a pair of edges while either in abutting or slightly spaced relationship by simply holding the electrodes generally parallel to or at an acute angle to the edges to be welded and allowing the welding operation to proceed automatically as the two electrodes burn back.

Figure 3 shows an electrode much similar to that of Figure 2 with the exception that the coating 16' is continuous about both electrode legs of the wire 9 rather than being two separate coatings held in touching relationship as is shown in Figure 2. The electrode of Figure 3 operates equally satisfactorily as that of Figure 2, although it is slightly more expensive to manufacture. Thus, to manufacture the electrodes of Figure 3, the wire 9 must be preformed prior to the application of the coating, the wire being bent so that the legs are straight, parallel and spaced. Thereafter, the coating may be placed therearound by extrusion or any other desired process.

Figure 4 shows an arrangement in accordance with the present invention which enables the laying down of a relatively wide weld bead such as is desired in the hard surfacing of metallic surfaces. Thus, in Figure 4, five electrodes, each identical in construction and comprised of a wire 35 and a coating 36, are provided. Thus wire 35 at the right hand; that is, the end remote from the welding end, terminates in an upwardly bent portion 35' which is bare; that is to say, not coated. Means are provided for electrically connecting these bare ends 35' in electrical parallel relationship, such means, in the embodiment shown, comprising a pair of clamp plates 40 spot welded as at 41 to the bare portions 35'. In the alternative, a special electrode holder may be provided which electrically connects these bared ends in parallel relationship. The plurality of electrodes as shown in Figure 4 are laid substantially parallel to the surface to be welded. The wire 35 is electrically energized relative to the workpiece and an arc initiated between one of the electrodes and the workpiece. This electrode burns back a short distance and then the arc shifts to the adjacent electrode which then burns back a short distance and the arc again shifts to an adjacent electrode, it having been found that the arc will continuously oscillate back and forth between the electrodes. It is to be pointed out that when using more than two electrodes, some care must be employed in the welding operation to insure that the arc will continuously oscillate back and forth across the ends of all of the electrodes. However, by carefully correlating the arc-welding currents and the sizes of the electrodes, it has been found possible to continuously burn off the ends of all of the electrodes. It is to be pointed out that with two electrodes, such as is shown in Figures 2 and 3, there is no problem. Both electrodes will always burn back with the arc oscillating back and forth from one wire to the other.

Thus it will appear that embodiments of the invention have been described which overcome all of the difficulties of the prior art and enable a weld seam to be laid down even when the edges to be welded are in spaced relationship, which does not require any skill or manipulation of the electrode by the welding operator.

The invention, while having been described with reference to a preferred embodiment, is not limited thereto. Obviously, modifications and alterations differing radically in appearance will occur to others upon a reading and understanding of this specification and it is our intention to include all such modifications and alterations insofar as they come within the scope of the appended claims.

Having thus described our invention, we claim:

1. A method of electric arc welding the edges of metallic workpieces which may, at points along their length, be in slightly spaced relationship, comprising providing an electrode consisting of a pair of parallel spaced core wires and a surrounding insulating coating holding such core wires in the spaced relationship, positioning said electrode so that one end touches the workpiece at the desired point of beginning of the weld and so that the electrode extends away from the workpiece at an angle less than 30 degrees and so that the pair of core wires are symmetrical to the bisecting plane of the edges, electrically energizing the opposite end of said electrode so that both core wires are energized from the same electrical power source, initiating an electric arc and allowing the arc to continue and burn back the arc end of the electrode without intentionally moving the electrode either transversely of or longitudinally of the desired weld seam during the welding operation.

2. A method of electric arc welding, a pair of metallic workpieces disposed relative to each other to have angularly disposed surfaces where the weld bead is to be made, comprising providing an electrode consisting of a pair of parallel spaced core wires and a surrounding insulating coating holding such core wires in spaced, electrically insulated relationship, positioning the electrode so that one end touches the workpiece at the desired point of beginning of the weld and so that the electrode extends away from the surfaces of the workpieces at an angle less than 30 degrees and so that the core wires are symmetrical to the bisecting plane between the surfaces of the workpiece, electrically energizing the opposite end of the electrode so that both core wires are energized from a common power source, initiating an arc between the electrode and the workpiece and allowing the arc to burn back the electrode without intentional movement of the electrode either transversely of or longitudinally of the desired weld seam, the arcing end of the electrode being at all times in engagement with the workpieces.

References Cited in the file of this patent

UNITED STATES PATENTS

| | | |
|---|---|---|
| 1,073,543 | Strohmenger | Sept. 16, 1913 |
| 1,441,688 | Jones | Jan. 9, 1923 |
| 1,834,069 | Miller | Dec. 1, 1931 |
| 1,857,521 | Stresau et al. | May 10, 1932 |
| 2,170,019 | Gaylord | Aug. 22, 1939 |

FOREIGN PATENTS

| | | |
|---|---|---|
| 5,184 | Australia | Dec. 13, 1926 |
| 152,733 | Great Britain | Oct. 12, 1920 |
| 567,867 | Great Britain | Mar. 6, 1945 |